(12) United States Patent
von der Weid et al.

(10) Patent No.: US 7,403,717 B2
(45) Date of Patent: Jul. 22, 2008

(54) METHOD AND APPARATUS FOR FIRST-ORDER POLARIZATION MODE DISPERSION COMPENSATION

(75) Inventors: Jean Pierre von der Weid, Rio de Janeiro (BR); Luis Carlos Blanco Linares, Rio de Janeiro (BR); Giancarlo Vilela de Faria, Rio de Janeiro (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 350 days.

(21) Appl. No.: 10/125,759

(22) Filed: Apr. 18, 2002

(65) Prior Publication Data

US 2004/0202480 A1    Oct. 14, 2004

(51) Int. Cl.
*H04B 10/00* (2006.01)
(52) U.S. Cl. .................. 398/152; 398/147; 398/158; 398/159; 398/161; 398/65; 398/102; 398/79; 398/81; 398/148; 385/11; 385/24; 385/25; 385/31; 385/27; 356/73.1
(58) Field of Classification Search ............... 398/147, 398/148, 149, 150, 152, 158, 159, 161, 162, 398/141, 65, 79, 81, 102; 385/11, 24, 15, 385/27, 25, 31; 356/73.1
See application file for complete search history.

(56) References Cited

U.S. PATENT DOCUMENTS

| | | | |
|---|---|---|---|
| 4,753,507 A | 6/1988 | DePaula et al. ........... 350/96.15 |
| 5,659,412 A | 8/1997 | Hakki ......................... 359/156 |
| 5,930,414 A | 7/1999 | Fishman et al. ............... 385/11 |
| 6,104,515 A | 8/2000 | Cao ............................ 359/161 |
| 6,144,450 A | 11/2000 | Jopson et al. ............... 356/364 |
| 6,271,952 B1 * | 8/2001 | Epworth .................... 398/147 |
| 6,483,958 B2 | 11/2002 | Bandemer et al. |
| 6,515,778 B1 * | 2/2003 | Epworth et al. ............... 385/37 |
| 6,556,732 B1 * | 4/2003 | Chowdhury et al. .......... 385/11 |
| 6,728,491 B1 * | 4/2004 | Ooi et al. .................... 398/147 |
| 6,829,440 B2 * | 12/2004 | Ooi et al. .................... 398/148 |
| 2002/0018266 A1 | 2/2002 | Ooi et al. .................... 359/161 |

FOREIGN PATENT DOCUMENTS

EP    1 109 338 A2    12/2000

OTHER PUBLICATIONS

Standard Search Report as completed by the ISA/EP on Dec. 13, 2002, in connection with U.S. Appl. No. 10/125,759, filed on Apr. 18, 2002.

(Continued)

*Primary Examiner*—Hanh Phan
(74) *Attorney, Agent, or Firm*—Michael Cameron

(57) ABSTRACT

Method and apparatus for compensating for first-order Polarization Mode Dispersion in an optical transmission system. An apparatus has a polarization controller for transforming polarization components of an optical signal carried by the optical fiber into orthogonal polarization states, a variable delay line for introducing a variable differential time delay between the polarization states and for producing an output optical signal that is compensated for PMD in the optical fiber, and a feedback unit for adjusting the polarization controller and the variable delay line to compensate for variations in the PMD of the optical fiber, the feedback unit including apparatus for generating a plurality of independent control signals to independently control actuators of the polarization controller and the variable delay line. The invention provides for a reduction in response time of the actuators and a reduction in complexity of an algorithm used to control the apparatus.

8 Claims, 3 Drawing Sheets

OTHER PUBLICATIONS

Optics Communications 182 (2000) 135-141, Aug. 1, 2000, "*Comparison of PMD-compensation techniques at 10 Gbit/s using an optical first-order compensator and electrical transversal filter*", T. Merker, N. Hahnenkamp and P. Meissner, 7 pgs.

* cited by examiner

METHOD AND APPARATUS FOR FIRST-ORDER POLARIZATION MODE DISPERSION COMPENSATION

BACKGROUND OF THE INVENTION

1. Field of the Invention

The present invention relates generally to the optical transmission field. More particularly, but not by way of limitation, the present invention relates to a method and apparatus for compensating for first-order Polarization Mode Dispersion in an optical transmission system.

2. Description of the Prior Art

Polarization Mode Dispersion (PMD) is the residual dispersion that arises in optical fibers because the degeneracy of the polarization modes within the fundamental spatial mode is leveled by small asymmetric stresses along the fiber. This dispersion may be sufficiently high to induce eye-closure penalties in an optical transmission system incorporating an optical fiber. When a sharp spectrum optical signal, such as is employed, for example, in WDM (Wavelength Division Multiplexing) transmissions, travels along an optical fiber; the signal can be described as being composed of the fastest and the slowest polarization modes, also called the Principal States of Polarization (PSP). The differential group delay between these states is variable as a result of random variations in external conditions imposed on the optical fiber; for example, variations in temperature, humidity and the like. As a result, polarization fading of a signal transmitted through the optical transmission system may be observed.

One proposed solution to the problem of fading in an optical transmission system is to always launch the light in one of the PSPs (see T. Ono, S. Yamazaki, H. Shimizu and H. Emura, *Polarization Control Method for Suppressing Polarisation Mode Dispersion in Optical Transmission Systems*, Journal of Lightwave Technology, vol. 12, pages 891-898, 1994). However, measuring or monitoring the input PSP requires access to and communication between both ends of the optical fiber; and, in many applications, this can present a significant problem.

In general, existing methods for avoiding fading in an optical transmission system encounter two related problems, random fluctuations of the Principal States of Polarization and random fluctuations of the Differential Group Delay. One known method that partly solves the fading problem consists of introducing a compensator in the form of a single linear birefringence element into the transmission system, for example, a piece of High Birefringence optical fiber, that has a delay that equals the PMD of the fiber, which is the mean value of the Differential Group Delays (DGD) along the fiber (see T. Takahashi, T. Imai and M. Aiki, *Automatic Compensation Technique for Timewise Fluctuating Polarization Mode Dispersion in In-line amplifier Systems*, Electronics Letters, vol. 30, no. 4, page 348, February, 1994; and R. Noe, D. Sandel, M. Yoshida-Dierolf and Others, *Polarization Mode Dispersion Compensation at 10, 20 and 40 Gb/s with various Optical Equalizers*, Journal of Lightwave Technology, vol. 17, no. 9, page 1602, September, 1999). A polarization transformer matches the PSP of the fiber to those of the delay element in such a way as to subtract their delays one from the other.

A disadvantage of this method is that only the mean value of the DGD is compensated for. Moreover, when the DGD of the fiber becomes small, the compensator will actually degrade the performance of the optical transmission system.

The use of a variable delay element can overcome these disadvantages (see, for example, the R. Noe et al publication identified above, as well as B. W. Hakki, *Polarization Mode Dispersion Compensation By Phase Diversity Detection*, IEEE Photonics Technology Letters, vol. 9, no. 1, page 121, January, 1997; F. Heismann, D. A. Fishman and D. L. Wilson, *Automatic Compensation of First-Order Polarization Mode Dispersion in a 10 Gb/s Transmission System*, ECOC'98, Madrid, Spain, pages 529-530, September, 1998; and U.S. Pat. No. 5,930,414). A problem that still remains with this approach, however, is how to control the polarization transformer to automatically perform adjustment of the axes. One proposed solution involves splitting a part of the optical signal at the receiver and measuring its degree of polarization (see S. Lanne, J-P. Thiery, D. Pennickx, J-P. Hamaide, J-P. Soigne, B. Desthieux, J. Le Briand, L. Mace and P. Gavignet, *Field Optical PMD Compensation at 10 Ghb/s Over Installed Fiber Totaling 35 ps of PMD*, ECOC 2000, Munich, Germany, pages 207-208, September, 2000).

U.S. Pat. No. 5,930,414 referred to above proposes yet another solution to the problem. This patent describes a method and apparatus for automatic compensation of first-order PMD based on the introduction of a variable linear birefringence element acting as a variable time delay line at the end of an optical transmission system. A polarization transformer aligns the output principal states of the fiber to the axes of the variable delay line. Alignment is automatically accomplished based on measurement of the amplitude of a plurality of frequency components contained in the optical information signal propagating through the fiber. This procedure avoids ambiguity in the control system, which could track the polarization state to a situation corresponding to a local maximum of the RF power instead of the absolute maximum.

In general, problems arise in many existing compensation methods when the states of polarization of the optical transmission system change rapidly; and limits in the response time of the compensator restricts its ability to follow these rapid changes. Frequently, the response time can be too long for the optical transmission system to maintain its synchronization.

The principal factors that limit the response time in various proposed compensation apparatus include the response time of materials used in actuators of the apparatus, and the complexity of the algorithm used to control the operation of the apparatus. In this regard, known compensation apparatus usually measure a few parameters which are then used as feedback signals to the actuators. Normally, the feedback signals come from spectral filtering (power signal in 1/(2T) and 1/(4T), where T is the period of the clock frequency of the system), bit error rate or degree of polarization. For example, in U.S. Pat. No. 5,930,414, all actuators are modulated at the same dithering frequency and are distinguished from one another through the phase of the detected signal. The number of independent parameters is necessarily smaller than the number of actuators if more than two actuators are used. Synchronizing pairs of actuators overcomes this difficulty if there are three or more actuators.

There is, accordingly, a need for a method and apparatus for compensating for Polarization Mode Dispersion in an optical transmission system that provides for a reduction in response time of the actuators used in the apparatus and a reduction in the over-all complexity of the algorithm used to control the apparatus.

SUMMARY OF THE INVENTION

The present invention provides a method and apparatus for compensating for Polarization Mode Dispersion in an optical transmission system that reduces the response time of actuators used in the apparatus; and, at the same time, that reduces the complexity of the algorithm used to control the apparatus as compared to known compensation apparatus.

An apparatus for compensating for Polarization Mode Dispersion (PMD) occurring in an optical fiber of an optical transmission system according to one aspect of the present invention comprises a polarization controller for transforming polarization components of an input optical signal carried by the optical fiber into orthogonal polarization states, a variable delay line for introducing a variable differential time delay between the polarization states and for producing an output optical signal that is compensated for PMD in the optical fiber, and a feedback unit for adjusting the polarization controller and the variable delay line to adjust for variations in the PMD of the optical fiber, the feedback unit including apparatus for generating a plurality of independent control signals for independently controlling actuators of the polarization controller and the variable delay line.

With the present invention, an independent control signal is associated with each actuator of the PMD compensation apparatus. As a result, all of the actuators can be operated simultaneously; and this permits the overall response time of the compensation apparatus to be significantly reduced. Accordingly, the compensation apparatus of the present invention is better able to track and to adjust for rapid changes in the PMD of the optical fiber.

According to a presently preferred embodiment of the invention, the apparatus for generating a plurality of independent control signals comprises a detector for converting a portion of the output signal to an electrical signal, and a multi-parameter measurement processor for processing the electrical signal to adjust the actuators of the apparatus. The multi-parameter measurement processor includes a splitter for dividing the electrical signal into two signals, a pair of spectral filters for filtering the two electrical signals at $F_1$ and $F_2$, where the pair of frequencies are within the spectral bandwidth of system operation, and $F_1 < F_2$ (preferably $0.5 \cdot F_2 \leq F_1 \leq 0.7 \cdot F_2$), and a detector for converting the filtered electrical signals to dithering signals. The electrical filtering and detection in each arm of the splitter provides a plurality of intensity signals each at a different dithering frequency. The intensity and phase of each of the dithering signals is then detected and processed to determine the adjustment required for each of the actuators.

According to a further aspect of the invention, a control algorithm is provided that uses the detected intensity and phase of the dithering signals to define the control signal for adjusting each of the actuators, each adjustment being given by a properly defined function of the intensity of the corresponding dithering signal.

Yet further advantages and specific details of the present invention will become apparent hereinafter in conjunction with the following detailed description of presently preferred embodiments of the invention.

DETAILED DESCRIPTION OF PRESENTLY PREFERRED EMBODIMENTS

Figure 1:
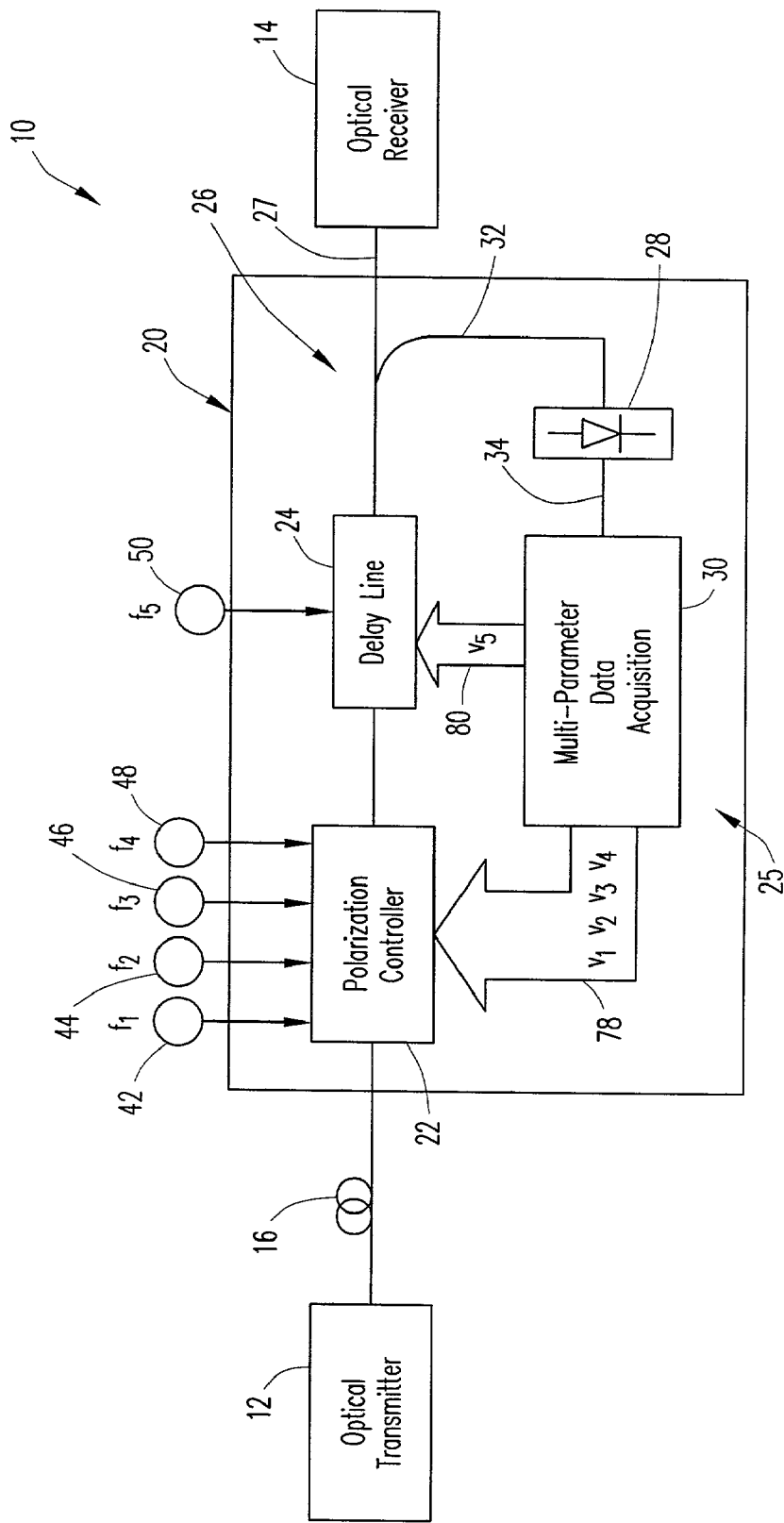
FIG. 1 is a block diagram that schematically illustrates an optical transmission system incorporating a Polarization Mode Dispersion (PMD) compensation apparatus according to a presently preferred embodiment of the present invention.

FIG. 1 is a block diagram that schematically illustrates an optical transmission system that incorporates a Polarization Mode Dispersion (PMD) compensation apparatus according to a presently preferred embodiment of the present invention. The optical transmission system is generally designated by reference number 10, and includes a B Gb/s optical transmitter 12, where B is a clock frequency of the system, a B Gb/s optical receiver 14 and an optical fiber 16 for transmitting an optical signal from the transmitter to the receiver.

The PMD compensation apparatus is generally designated by reference number 20, and functions to compensate for first-order PMD in an optical signal transmitted through the optical fiber 16 of the optical transmission system 10. PMD compensation apparatus 20 is incorporated into the optical transmission system between the transmitter and receiver, and generally comprises an automatic polarization controller 22, a variable delay line 24, and a feedback unit 25 for adjusting the automatic polarization controller 22 and the variable delay line 24 to adjust for variations in the PMD of the optical fiber 16. The feedback unit 25 generally includes an optical coupler 26, a photodetector 28 and a multi-parameter data acquisition apparatus 30.

The polarization controller 22 transforms polarization components of the optical signal from the transmitter 12 and carried by the optical fiber 16 into orthogonal polarization states, and the variable delay line 24 comprises a linear variable birefringence element for introducing a variable differential time delay between the polarization states and produces an output optical signal on line 27 that is transmitted to the receiver 14. By properly adjusting the polarization transformation that occurs in the controller 22 and the time delay that occurs in the variable delay line 24, the PMD compensation apparatus 20 effectively compensates for the effects of PMD in the optical fiber 16, and the output signal 27 will be substantially free of distortions caused by differential time delays occurring in the optical fiber 16.

The polarization controller 22 in series with the variable delay line 24, however, are not alone sufficient to adapt to changes in the PMD in the fiber as may be caused, for example, by random variations in external conditions imposed on the optical fiber 16. Feedback unit 25 is, accordingly, provided to automatically adjust both the polarization transformation occurring in the controller 22 and the differential time delay in the variable delay line 24 so as to automatically adjust the compensation apparatus 20 for these variations. In effect, the feedback unit monitors the amount of distortion in the output signal 27 and adjusts the polarization transformation and the differential time delay in an effort to minimize the distortion in the output signal.

As was described previously, however, the states of polarization of the optical fiber often change quite rapidly, and to function effectively, any compensation apparatus must be able to follow these rapid changes. Such rapid changes may be caused, for example, by accidental handling of the uncabled fiber cord at the terminals during maintenance. In accordance with the present invention, a PMD compensation apparatus 20 is able to follow the rapid changes in the states of polarization of the optical fiber 16, and adjust the variable delay line 24 using a simple algorithm. According to the invention, this is accomplished by associating one independent feedback signal to each actuator of the apparatus.

Figure 2:
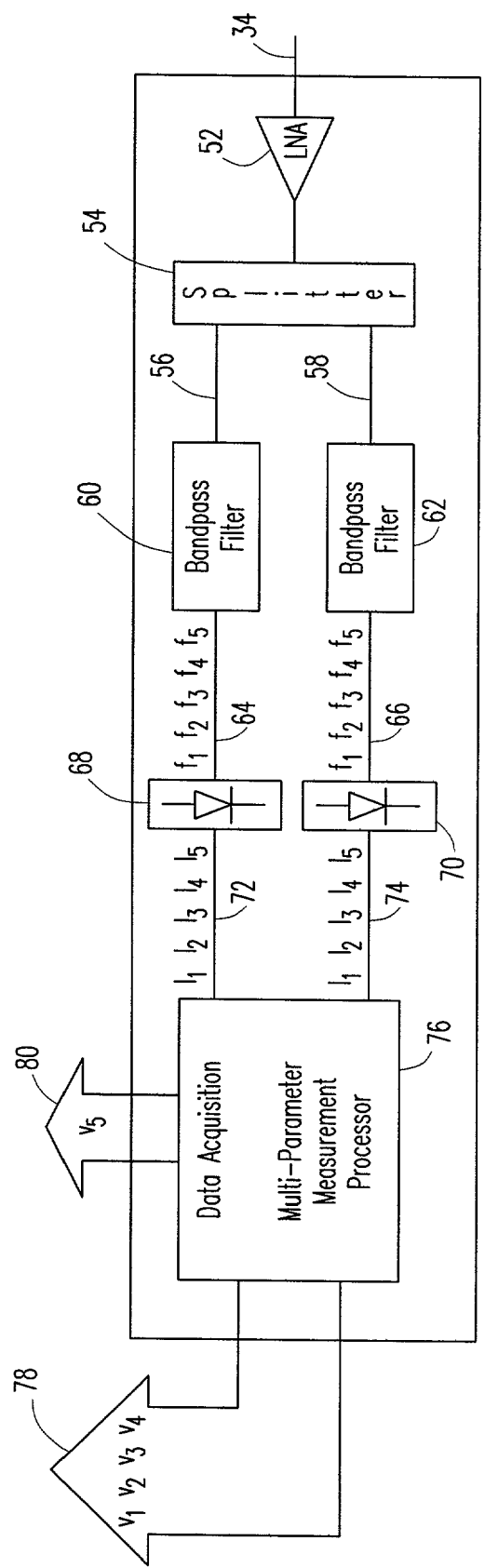
FIG. 2 is a block diagram that illustrates details of the multiple-parameter data acquisition apparatus of the PMD compensation apparatus of FIG. 1.

In particular, as illustrated in FIG. 2, polarization controller 22 includes a plurality of four actuators comprising four wave plates 42, 44, 46 and 48, although the controller may include more than four actuators, if desired. Each wave plate is preferably constructed using a piece of normal optical fiber which is squeezed using a piezoelectric multiple-layer actuator, for example, an actuator fabricated by Thorlabs, Inc. and identified as piezoelectric multiple-layer actuator model: AE0203D08, and which has a response time of 2.5 μs. The polarization controller can, for example, be similar that described in U.S. Pat. No. 4,753,507; however, in the presently preferred embodiment of the invention described herein, the device includes four waveplates aligned at 22.5°, 0°, 45° and 0°, respectively. A fifth actuator may be added, aligned at 67.5° to the same reference axis as the other four actuators. The dithering signal used in each wave plate has a low modulation index so that the corresponding variations in the polarization state will only be felt within the apparatus and not by the system. Other devices for polarization control can also be used, provided that a dithering signal is superimposed onto the control signal.

The variable polarization delay line 24 includes an actuator comprising a single wave plate 50, and can also take various forms. For example, the variable delay lines described in U.S. Pat. No. 5,930,414 would be suitable for use in the PMD apparatus of the present invention. The variable delay line can comprise a plurality of PZT actuators at different points of the birefringent fiber with an arbitrary separation between the PZT actuators for obtaining different DGDs for different wavelengths. Another solution according to a preferred embodiment of the present invention is to use a single piece of birefringent fiber pressed in the middle by a single PZT actuator with the force aligned at 45° to the birefringence axes. This will produce a delay varying from zero to the DGD of the full length of the birefringent fiber.

A portion of the optical signal 27 that is output from the compensation apparatus 20 is split off by the coupler 26 and is used as a feedback signal. This feedback signal is designated by line 32, and contains spectral information about the output signal. Signal 32 is detected by photodetector 28 that generates an electrical signal 34 that is proportional to the optical signal 32; and the electrical signal 34 is directed to a multi-parameter data acquisition apparatus 30.

The multi-parameter data acquisition apparatus 30 is illustrated in greater detail in FIG. 2, and processes the electrical signal 34 to operate the wave plates 42, 44, 46, 48 and 50 to adjust the polarization controller 22 and the variable delay line 24 as necessary to compensate for changes in the PMD of the optical fiber 16. As shown in FIG. 2, the electrical signal 34 from the photodetector 28 first enters a low noise amplifier (LNA) 52 and is then divided by a splitter 54 into signals 56 and 58. The signals 56 and 58 then pass through spectral filters 60 and 62, and the resultant filtered electrical signals 64 and 66 are then detected by detectors 68 and 70, respectively. Spectral filter 60 is for filtering in $F_1$ and spectral filter 62 is for filtering in $F_2$. For the spectral filtering in $F_2$, a bandpass filter or highpass can be used; and for the filtering in $F_1$, a bandpass filter is used. The electrical filtering in each arm of the splitter 54 gives five intensity signals $I_1, I_2, I_3, I_4$ and $I_5$ which are at frequencies $f_1, f_2, f_3, f_4$ and $f_5$ respectively, as illustrated in FIG. 2. These feedback signals allow the alignment of the fast output principal state of polarization (PSP) of the optical fiber 16 to the slow input PSP of the variable delay line 24, and adjust the delay time at the delay line 24.

The electrical filtering at $F_1$ and $F_2$ provides two feedback signals for each wave plate of the polarization controller 22, and one additional feedback signal for the variable delay line 24. By using the information carried in $f_1, f_2, f_3, f_4$ and $f_5$, it is possible to align the PSPs of the system with the inverse PSPs of the variable delay line. The fast PSP of the system is aligned with the slow PSP of the delay line, and vice versa, using the criteria of signal minimization in modulation frequencies. The optical transmission system will be compensated when the dithering signal intensities $I_1, I_2, I_3, I_4$ and $I_5$ reach a minimum value.

The feedback signal intensity and phase in each frequency is detected using, for example, lock-in amplifiers, or a Digital Signal Processor (DSP); and a convergence algorithm determines the feedback signal for each wave plate, using the intensity and the phase of the signals at $f_1, f_2, f_3, f_4$ and $f_5$. The DSP and the convergence algorithm is generally designated in FIG. 2 as Data Acquisition—Multi-Parameter Measurement Processor 76.

The algorithm to compensate for the PMD first minimizes the signal intensities corresponding to the filter at $F_1$ and then refines the process using the feedback signals from the filter at $F_2$. These criteria guarantee that the apparatus will not be in a situation of local minima. By using the intensity and phase of the dithering signal of each wave plate, the signal of the correction to be applied to each wave plate is known. By correcting all wave plates of the apparatus at the same time, the response of the apparatus is significantly shortened. In order to get stable phase information, the dithering signals for each wave plate could be generated by the same DSP clock synthesizer. The control algorithm uses the intensity and phase of each dithering signal to define the correction signal for each wave plate, the correction being calculated as a predefined function of the intensity of the dithering signal. The correction signals for the four wave plates 42, 44, 46 and 48 of the automatic polarization controller 22 are illustrated by arrow 78 in FIGS. 1 and 2, and the correction signal for the wave plate 50 of the variable delay line 24 is illustrated by arrow 80 in the Figures.

Figure 3:
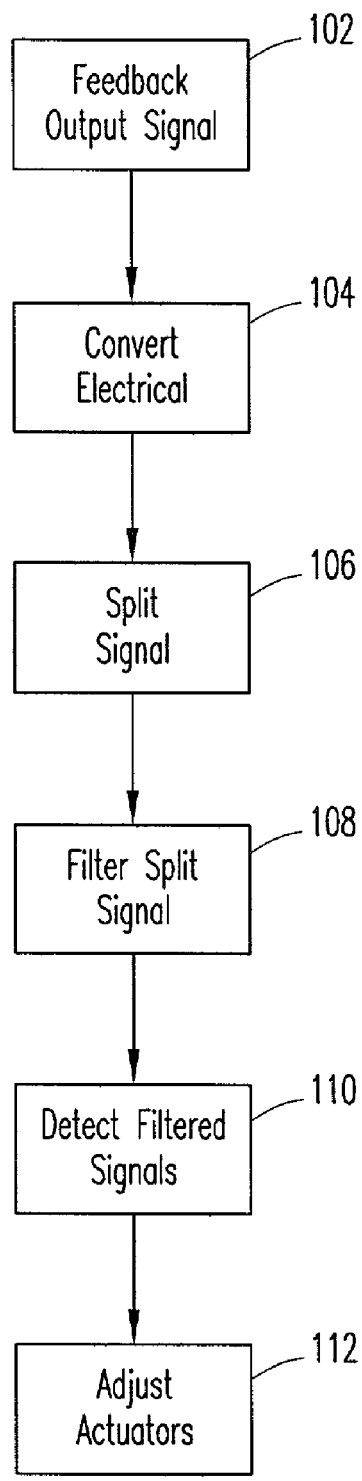
FIG. 3 is a flow chart that illustrates steps of a method for compensating for PMD in an optical transmission system according to a further embodiment of the present invention.

FIG. 3 is a flow chart that illustrates steps of a method for compensating for PMD in an optical transmission apparatus according to a further embodiment of the present invention. As shown, a portion of the output signal from the compensation apparatus 20 is split off as a feedback optical signal (step 102). The feedback signal is then converted to an electrical signal (step 104). The electrical signal is split into two signals (step 106), and the two signals are filtered by spectral filters for filtering in $F_1$ and $F_2$, respectively (step 108). The filtered signals are then detected (step 110) to provide a plurality of dithering intensity signals, each at a different frequency. The dithering intensity signals are then used to define a plurality of control signals to independently adjust a plurality of actuators of the compensation apparatus to adjust the PMD of the optical transmission apparatus (step 112).

In general, by using the multiple-parameter data acquisition apparatus and control algorithm according to the present invention; response time of the compensation apparatus 20 is improved because the independent feedback signals allow simultaneous actuation of all the plurality of wave plates. The present invention makes possible a reset free control of polarization and compensation of PMD using piezoelectric actuators with a simple control algorithm as compared to typical known PMD compensation apparatus.

It should be understood that the term "comprises/comprising" when used in this specification is taken to specify the presence of stated features, integers, steps or components; but does not preclude the presence or addition of one or more other features, integers, steps, components or groups thereof While what has been described herein constitutes presently preferred embodiments of the invention, it should be understood that the invention can be varied in numerous ways without departing from the scope thereof. Accordingly, it should be recognized that the invention should be limited only insofar as is required by the scope of the following claims.

The invention claimed is:

1. A polarization mode dispersion (PMD) compensation apparatus for compensating for polarization mode dispersion occurring in an optical fiber of an optical transmission system so as to provide a compensated output signal to an optical receiver, said PMD compensation apparatus comprising:
   a polarization controller having a first set of piezoelectric actuators and a variable delay line having a second set of piezoelectric actuators;
   a feedback unit, having an apparatus for generating a plurality of independent control signals, wherein said apparatus for generating a plurality of independent control signals further comprises:
      a photodetector for converting a portion of the output signal to an electrical signal, and
      a multi-parameter measurement processor for processing the electrical signal to adjust the first set and second set of piezoelectric actuators of the polarization controller and the variable delay line, the multi-parameter measurement processor including:
         a splitter for dividing the electrical signal into two signals, a pair of spectral filters for filtering the two electrical signals at $F_1$ and $F_2$, respectively, and
         a detector for converting the filtered electrical signals to dithering signals, each at a different frequency, wherein the intensity and phase of each of the dithering signals is then detected and processed to determine the independent control signals for independently adjusting each of said first set and second set of piezoelectric actuators.

2. The apparatus according to claim 1, wherein said feedback unit adjusts the polarization controller and the variable delay line to compensate for variations in the PMD of the optical fiber.

3. The apparatus according to claim 1, wherein said feedback unit simultaneously controls said first set and second set of piezoelectric actuators.

4. The apparatus according to claim 1, wherein said plurality of independent control signals are provided from a plurality of dithering signals of different frequency.

5. The apparatus according to claim 1, wherein a dithering signal is superimposed onto an independent control signal with a different frequency for identifying each piezoelectric actuator giving amplitude and phase information to provide the correction signal to the multi-parameter measurement processor to correctly compensate for PMD.

6. A method for compensating for polarization-mode dispersion (PMD) occurring in an optical fiber transmission system providing a compensated output signal to an optical receiver including a PMD compensation apparatus having a polarization controller having a first set of piezoelectric actuators and a variable delay line having a second set of piezoelectric actuators, said PMD compensation apparatus further having a feedback unit, said feedback unit including an apparatus for generating a plurality of independent control signals, said method comprising the steps of:
   transforming polarization components of an optical signal into orthogonal polarization states;
   introducing a variable differential time delay between the polarization states for producing an optical signal that is compensated for PMD in an optical fiber;
   adjusting the polarization controller and the variable delay line to compensate for variations in the PMD of the optical fiber, said adjusting step including independently controlling the first set of piezoelectric actuators of said polarization controller and said second set of piezoelectric of said variable delay line through a substep of:
      generating independent control signals, wherein said step of generating independent control signals further comprises the steps of:
         converting a portion of the output signal to an electrical signal; and
         processing the electrical to adjust the first set and second set of piezoelectric actuators of the polarization controller and the variable delay line, the processing step further comprising the steps of:
            dividing the electrical signal into two electrical signals:
            filtering the two electrical signals at F1 and F2 respectively. and
            converting the filtered electrical signals to dithering signals, each at a different frequency, wherein the intensity and phase of each of the dithering signals is then detected and processed to determine the control signals for independently adjusting each of the first set and second set of piezoelectric actuators.

7. The method according to claim 6, wherein said step of independently controlling said first set and second set of piezoelectric actuators comprises simultaneously controlling said first set and second set of piezoelectric actuators.

8. The method according to claim 6, wherein said step of independently controlling said first set and second set of piezoelectric actuators comprises independently controlling said first set and second set of piezoelectric actuators from a plurality of dithering signals of different frequency.

* * * * *